(12) United States Patent
Mudric et al.

(10) Patent No.: US 12,041,081 B2
(45) Date of Patent: Jul. 16, 2024

(54) METHOD AND SYSTEM FOR DISCOVERING, REPORTING, AND PREVENTING DUPLICATE ADDRESS DETECTION ATTACKS

(71) Applicant: Avaya Management L.P., Wilmington, DE (US)

(72) Inventors: Dusan Mudric, Ottawa (CA); Martin Vuille, Ottawa (CA); Wai-Hung Leung, Nepean (CA)

(73) Assignee: Avaya Management L.P., Wilmington, DE (US)

(*) Notice: Subject to any disclaimer, the term of this patent is extended or adjusted under 35 U.S.C. 154(b) by 288 days.

(21) Appl. No.: 16/888,382

(22) Filed: May 29, 2020

(65) Prior Publication Data

US 2021/0377296 A1 Dec. 2, 2021

(51) Int. Cl.
*H04L 9/40* (2022.01)
*H04L 9/08* (2006.01)

(52) U.S. Cl.
CPC ........ *H04L 63/1466* (2013.01); *H04L 9/0869* (2013.01); *H04L 63/0876* (2013.01); *H04L 63/1416* (2013.01)

(58) Field of Classification Search
CPC ............ H04L 63/0876; H04L 63/1416; H04L 63/1466; H04L 9/0869
See application file for complete search history.

(56) References Cited

U.S. PATENT DOCUMENTS

| | | | | |
|---|---|---|---|---|
| 7,155,500 B2* | 12/2006 | Nikander | ............ | H04L 63/0442 |
| | | | | 726/26 |
| 7,734,745 B2* | 6/2010 | Gloe | ................. | H04L 29/12066 |
| | | | | 709/245 |
| 7,949,876 B2* | 5/2011 | Haddad | ............... | H04L 63/1441 |
| | | | | 713/168 |
| 8,862,870 B2* | 10/2014 | Reddy | ..................... | H04L 67/02 |
| | | | | 713/153 |
| 9,100,433 B2* | 8/2015 | Takazoe | ............. | H04L 63/1466 |
| 10,063,675 B2* | 8/2018 | Thomas | ............. | H04L 61/5007 |
| 2002/0133607 A1* | 9/2002 | Nikander | ............ | H04L 63/0823 |
| | | | | 709/229 |
| 2003/0026230 A1* | 2/2003 | Ibanez | ................ | H04L 61/5046 |
| | | | | 370/475 |

(Continued)

OTHER PUBLICATIONS

Ahmed et al. "IPv6 Neighbor Discovery Protocol Specifications, Threats and Countermeasures: A Survey," IEEE Access, 2017, vol. 5, pp. 18187-18210.

(Continued)

*Primary Examiner* — Daniel B Potratz
*Assistant Examiner* — Matthias Habtegeorgis
(74) *Attorney, Agent, or Firm* — Sheridan Ross P.C.

(57) ABSTRACT

A system and method for intelligently detecting a duplicate address attack is described. The system and method comprise transferring a first address conflict check message; receiving a first address conflict check response message; performing intelligent Duplicate Address Detection (DAD) to determine if the duplicate address attack is valid; and if the duplicate address attack is valid, then reporting the duplicate address attack to a monitoring server. An intelligent switch that detects the DAD attack blocks further address conflict check response messages from the attacker's MAC address.

16 Claims, 9 Drawing Sheets

(56) References Cited

U.S. PATENT DOCUMENTS

| | | | | |
|---|---|---|---|---|
| 2004/0117657 | A1* | 6/2004 | Gabor | H04L 63/061 726/4 |
| 2005/0078635 | A1* | 4/2005 | Choi | H04W 36/0011 370/428 |
| 2005/0271032 | A1* | 12/2005 | Yun | H04W 88/06 370/349 |
| 2008/0077752 | A1* | 3/2008 | Kinoshita | G06F 11/0787 711/154 |
| 2012/0151085 | A1* | 6/2012 | Singh | H04L 12/66 709/232 |
| 2013/0166737 | A1* | 6/2013 | Christenson | H04L 61/5046 709/224 |
| 2014/0150058 | A1* | 5/2014 | Baig | H04L 63/08 726/3 |
| 2016/0149856 | A1* | 5/2016 | Hui | H04L 61/5014 370/252 |
| 2020/0099654 | A1* | 3/2020 | Jose | H04L 61/5007 |

OTHER PUBLICATIONS

Alsa'Deh et al. "IPv6 Stateless Address Autoconfiguration: Balancing Between Security, Privacy and Usability," 5th International Symposium on Foundations & Practice of Security (FPS), Oct. 25-26, 2012, 2013, Montreal, QC, Canada, pp. 149-161.

Barbhuiya et al. "Detection of neighbor discovery protocol based attacks in IPv6 network," Networking Science, 2013, vol. 2, pp. 91-113 (Abstract Only).

Buenaventura et al. "IPv6 Stateless Address Autoconfiguration (SLAAC) Attacks and Detection," Proceedings of the DLSU Research Congress, 2015, vol. 3, 7 pages.

Lu et al. "An SDN-Based Authentication Mechanism for Securing Neighbor Discovery Protocol in IPv6," Security and Communication Networks, Jan. 2017, vol. 2017, Article ID; 5838657, 10 pages.

Najjar et al. "Detecting neighbor discovery protocol-based flooding attack using machine learning techniques," Advances in Machine Learning and Signal Processing, 2016, pp. 129-139.

Nikander "Denial-of-service, address ownership, and early authentication in the IPv6 world," Security Protocols, 2002, pp. 12-21.

Perumal et al. "Trust based security enhancement mechanism for neighbor discovery protocol in IPv6," International Journal of Applied Engineering Research, 2016, vol. 11, No. 7, pp. 4787-4796 (Abstract Only).

Pilihanto "A complete guide on IPv6 attack and defense," SANS Institute, 2012, 76 pages [retrieved online from: www.sans.org/reading-room/whitepapers/detection/complete-guide-ipv6-attack-defense-33904].

Praptodiyono et al. "Security Mechanism for IPv6 Stateless Address Autoconfiguration," 2015 International Conference on Automation, Cognitive Science, Optics, Micro Electro-Mechanical System, and Information Technology (ICACOMIT), Bandung, Indonesia, Oct. 29-30, 2015, 7 pages.

Praptodiyono et al. "Securing Duplicate Address Detection on IPv6 Using Distributed Trust Mechanism," International Journal of Simulation—Systems, Science & Technology (IJSSST), 2016, vol. 17, No. 32, pp. 3.1-3.9.

Rehman et al. "Rule-based mechanism to detect denial of service (DoS) attacks on duplicate address detection process in IPv6 link local communication," 2015 4th International Conference on Reliability, Infocom Technologies and Optimization (ICRITO) (Trends and Future Directions), Sep. 2-4, 2015, AIIT, Amity University Uttar Pradesh, Noida, India, pp. 223-227.

Rehman et al. "Integrated Framework to Detect and Mitigate Denial of Service (DoS) Attacks on Duplicate Address Detection Process in IPv6 Link Local Communication," International Journal of Security and Its Applications, 2015, vol. 9, No. 11, pp. 77-86.

Rehman et al. "Novel Mechanism to Prevent Denial of Service (DoS) Attacks in IPV6 Duplicate Address Detection Process," International Journal of Security and Its Applications, 2016, vol. 10, No. 4, pp. 143-154.

Rostanski et al. "Security Issues of IPv6 Network Autoconfiguration," Computer Information Systems and Industrial Management (CISIM), 2013, pp. 218-228.

Sarma "Securing IPV6's Neighbour and Router Discovery, using Locally Authentication Process," IOSR Journal of Computer Engineering, May-Jun. 2014, vol. 16, No. 3, pp. 22-31.

Shah et al. "Optimizing Security and Address Configuration in IPv6 SLAAC," Procedia Computer Science, Jan. 2015, vol. 54, pp. 177-185.

Sharma et al. "Security concerns of ipv6-slaac and security policies to diminish the risk associated with them," Cyber Times International Journal of Technology & Management, Oct. 2013-Mar. 2014, vol. 7, No. 1, pp. 902-911.

Song et al. "Novel Duplicate Address Detection with Hash Function," PLoS ONE, 2016, vol. 11, No. 3, e0151612.

Tayal "IPV6 SLAAC related security issues and removal of those security issues," International Journal of Engineering and Computer Science, 22014, vol. 3, No. 9, pp. 8455-8459.

Tomar et al. "A Novel Central Arbiter to Mitigate Denial of Service Attacks on Duplicate Address Detection in IPV6 Networks," SECURWARE 2017: The Eleventh International Conference on Emerging Security Information, Systems and Technologies, 2017, 9 pages.

Yao et al. "A Pull Model IPv6 Duplicate Address Detection," Proc. IEEE 35th Conf. Local Comput. Netw., Oct. 2010, Denver, Colorado, pp. 372-375.

* cited by examiner

METHOD AND SYSTEM FOR DISCOVERING, REPORTING, AND PREVENTING DUPLICATE ADDRESS DETECTION ATTACKS

FIELD OF THE DISCLOSURE

The present disclosure is generally directed toward communications and more particularly toward the discovery, reporting, and prevention of duplicate address detection attacks.

BACKGROUND

Communication devices are used for voice and video calling, video conferencing, gaming, Internet access, media streaming, data messaging, email, machine-to-machine data transfers, computerized information services, and the like. Communication devices exchange data over communication networks to provide these various services. The communication devices may be phones, smartphones, computers, laptops, tablets, wearable devices, media players, intelligent machines, and the like. Communication devices are assigned an Internet Protocol (IP) address to identify and locate the communication device on a communication network. IP addresses need to be unique, meaning each device has a unique IP address. IPv6 allows for autoconfiguration of IP addresses, which means communication devices can obtain an IP address automatically. Autoconfiguration may simplify address assignment, but improper or malicious configuration could cause problems. For example, autoconfiguration allows a system/network to be susceptible to security threats, such as denial of service (DoS) attacks during the autoconfiguration process. DoS attacks seeks to make a machine and/or network resource unavailable by temporarily or indefinitely disrupting the services of a host connected to the network. DoS attacks are typically accomplished by attempting to overload the targeted machine with requests such that legitimate requests cannot be fulfilled. An example of a DoS attack is a duplicate address detection (DAD) attack.

Duplicate Address Detection (DAD) is a protocol in IPv6 that enables an endpoint to verify the uniqueness of an address. DAD is performed on an address before it can be used by a host. In essence, the host sends a probe message (e.g., a multicast Neighbor Solicitation message) to other devices on the network to verify another device has not claimed the address. When a host wants to claim an IPv6 address, it sends an ICMPv6 NS (Neighbor Solicitation) for the address the host is attempting to claim (for example, Host A sends an ICMPv6 NS message with the address 2001:DB8:600D::A). If the other hosts on the network do not respond to the ICMPv6 NS message with an ICMPv6 NA (Neighbor Advertisement) message stating that the address is taken, then Host A will be able to use the address 2001:DB8:600D::A.

In duplicate address detection attacks, a malicious host (e.g., Host T) may want to prevent other hosts from receiving an IP address. Therefore, in the example above, when Host A sends the ICMPv6 NS message with the address 2001:DB8:600D::A, Host T will respond with an ICMPv6 NA message stating that the address is taken, regardless of the address used by Host T. Host A may try to claim another address 2001:DB8:600D::AA using the same procedure, Host T will send another ICMPv6 NA message claiming the address. Essentially, Host T will "claim" every available IP address to prevent Host A from getting an IP address to connect to the network. Multiple other issues may be caused by a DAD attack, such as, but not limited to increased power usage. Furthermore, current DAD methods may not always be effective (e.g., on Wi-Fi networks and multi-link subnets).

SUMMARY

Embodiments of the present disclosure seek to intelligently apply Duplicate Address Detection (DAD) to discover and prevent duplicate address detection attacks.

It is, therefore, one aspect of the present disclosure to provide a method of intelligently performing DAD using secret Random Interface Identifiers (SRIIDs) and allocated MAC addresses.

In existing solutions to duplicate address detection attacks, the NS messages are secured. For example, the Host requesting the address sends a secure NS message, which is authenticated. However, these solutions are complex and difficult to implement.

When a host wants to claim an IPv6 address, it sends an address conflict check message (e.g., an ICMPv6 NS (Neighbor Solicitation message) with the address the host is attempting to claim. For example, Host A transfers an ICMPv6 NS message with the address 2001:DB8:600D::A, if other hosts on the network do not respond to with an address conflict check response message (e.g., an ICMPv6 NA (Neighbor Advertisement) message) stating that the address is taken, then Host A will be able to use the address 2001:DB8:600D::A. Conversely, if another host responds with an ICMPv6 NA message stating that the address is taken, then Host A will not be able to use the address 2001:DB8:600D::A, and must repeat the process (i.e., send another address conflict check message) until an "available" address is obtained. However, if a host maliciously responds with an address conflict check response message stating that the address is taken, even if the address is not taken, this is known as a duplicate address detection (DAD) attack, causing Host A to repeat the process until Host A times out (e.g., maximum tries attempted).

However, if Host A is configured with intelligent DAD using one or more secret Random Interface Identifiers (SRIIDs) and/or allocated MAC addresses, when Host A sends an address conflict check message including an SRIID and receives an address conflict check response message, the Host will determine there is a duplicate address detection attack and identify the malicious host. Each host configured with intelligent DAD is configured with one or more SRIIDs and/or L2 MAC addresses. With intelligent DAD, when Host A suspects a duplicate address detection attack, Host A will send another n (where n>1) address conflict check messages, wherein some of the address conflict check messages include a real SLAAC address and others contain one of the SRIIDs, the use of the SRIID is randomized, such that the number attempts with an SRIID is random and the order in which a real SLAAC address or an SRIID is used is also random. Once Host A has detected the duplication address detection attack (e.g., once an address conflict check response message with the SRIID is received), Host A will send one more address conflict check message with a MID in order to obtain a real SLAAC address to join the network. Since Host A has already detected the duplicate address detection attack, Host A knows to block and/or ignore the address conflict check response message from the malicious host. In other words, in a random n attempts (where n>1) the Host A will send subsequent address conflict check messages, one or more of which contain one of the configured SRIIDs, if an address conflict check response message is received in response to a subsequent address conflict check message using the SRIID, then the malicious host has been identified.

Intelligent DAD is interoperable with hosts configured with intelligent DAD and hosts not configured with intelligent DAD. Each host that implements intelligent DAD is configured with one or more SRIIDS For example, the one or more SRIIDs are pre-allocated and may be distributed securely (e.g., assigned manually or sent in an out of band message). The SRIIDs are not available for assignment by hosts configured with intelligent DAD (e.g., used for a SLAAC address). However, a host (e.g., Host B) that that is not configured with intelligent DAD, may use SLAAC (stateless address autoconfiguration) algorithm to create an IPv6 address, and randomly generate one of SRIIDs. If Host B sends an address conflict check message with the randomly generated SRIID, other hosts configured with the intelligent DAD algorithm, would mark that particular SRIID not to be used, and will not respond with an address conflict check response message, thereby allowing Host B to create a real SLAAC IPv6 address. In other words, a SRIID may be assigned to a non-malicious host not configured with intelligent DAD. The SRIIDs are used to detect a duplicate address detection attack, if a host/device responds to an address conflict check message using a SRIID sent from a host configured with intelligent DAD, with an address conflict check response message claiming it owns the address with the SRIID, then that host/device is the attacker. The system may be further configured with an intelligent switch that is able to block the detected attacker. This may include blocking packets from the source MAC address of the detected attacker. Blocking the detected attacker may also include blocking a port associated with the attacker (i.e., blocking the port over which the address conflict check response message claiming it owns the address with the SRIID was received).

For example, Host A is configured with intelligent DAD and sends an address conflict check message with a SLAAC address, and Host T responds with an address conflict check response message claiming that it has the address. In some cases, Host T may legitimately have the address; therefore, Host A now performs intelligent DAD to determine if there is a duplication address detection attack.

Host A determines if there is a duplication address detection attack by sending one or more subsequent address conflict check messages, some of which use a real SLAAC address and others that use a SRIID, if Host T responds with an address conflict check response message claiming that Host T has the address with the SRIID, then Host A will discover the duplicate address detection attack. Host A may ignore subsequent address conflict check response messages from Host T (in order to obtain an IP address); and report the attack to the monitoring service (e.g., a SysLog server).

Intelligent DAD randomizes the use of the SRIIDs to prevent a malicious host from circumventing discovery and/or discovering the SRIIDs. For example, if Host A sends an address conflict check message with a SRIID in the next address conflict check message, immediately after the initial exchange (without SRIID), then the attacker may be able to predict that it should not reply to the next message, this would cause the attacker to circumvent the DAD and may also allow the attack to discover one of the SRIID. Therefore, the order in which an address conflict check message with the SRIID and/or secret MAC address is sent is randomized in order to prevent the attacker from discovering the algorithm and/or the SRIIDs/secret MAC addresses.

In some embodiments, all hosts/devices are configured with one or more SRIIDs, which are used intelligently to detect a duplicate address detection attack. However, the method and system is interoperable with host/devices that are not configured with intelligent DAD.

In some embodiments, the system may also include an intelligent switch that blocks the malicious host (e.g., attacker). The intelligent switch may be configured to check which host replies to the intelligent DAD requests (i.e., NA with SRIID). If the intelligent switch finds a SRIID in a NA response, the switch blocks the packets with that source MAC address and/or the port over which the NA with the SRIID are received.

Additionally, at initialization or another time, the system may test the link for the SRIIDs to make sure there are no collisions (i.e., a host already using an SRIID as a SLAAC address). For the test, a host will create an IPv6 SLAAC address using one of the SRIIDs, make sure there is no responses during the test. If there is an address conflict check response message, the SRIID may be marked used/unavailable. This process may be repeated for each of the allocated SRIIDs. This will ensure there are no devices on the link that are using an SRIID based IPv6 address.

In addition, the hosts/devices may also be configured with a reserved MAC address (e.g., a secret MAC address and a key). All hosts on a link are configured with the same list of secret MAC (S-MAC) addresses. The secret MAC address is used as the source MAC address for the subsequent address conflict check messages during intelligent DAD, to make it difficult for the attacker to corelate address conflict check messages from different IPv6 addresses (e.g., to conceal that subsequent address conflict check messages are coming from the same host).

In one example, there are N DAD tries configured, where N>=3. One of these tries is selected at random to use the SRIID, call it n_SRIID, 3<=n_SRIID<=N. This allows the host to complete intelligent DAD for the first address quickly. If the first DAD fails, due to a small probability that there is another host on the link using the same SLAAC address, a host would generate a second SLAAC (not using SRIID) and perform the second DAD attempt. If the second DAD attempt fails, this is an indication of a possible attack. Successive DAD attempts (from the $3^{rd}$ attempt onward) might use a SRIID, based on the random SRIID selection. For "i=1 to N." If "i==n_SRIID", use the secret SRIID, else use real info. If "i !=n_SRIID" and DAD succeeds, use that address. If "i==n_SRIID" and DAD fails perform n_SRIID+1 optimistic DAD and report a suspected attack (even if there is NA response), or disable DAD, create SLAAC address (i.e., send one more NS using SLAAC), and report a suspected attack to the monitoring server. An intelligent switch that can detect an NA is a response to NS with SRIID. For example, a switch may block/ignore the packets.

If "i==n_SRIID" and DAD succeeds, the attacker may be purposefully ignoring the NS in order to discover the SRIIDs. For example, if the system merely increments the DAD counter and sends DAD NS for a real SLAAC. This would notify the attacker that the previous DAD NS used a SRIID The attacker may be able to discover all the SRIIDs by randomly not responding. Therefore, a more robust solution involves using multiple SRIIDs, with randomized distribution (i.e., randomizing using a real SLAAC address or a SRIID based SLAAC in NS). The larger N DAD attempts and the larger number of SRIIDs, the more difficult it will be for the attacker to discover all SRIIDs and avoid responding to them using NA.

In some embodiments, in addition to the multiple SRIIDs, a host may change its Ethernet Source MAC address in the subsequent address conflict check messages. By using a secret source MAC address, the attacker will not be able to correlate the address conflict check messages, in other words, the attacker will not know if the "i==n_SRIID" request comes from the same source and whether it should ignore or respond. If the attacker responds with an address conflict check response message for the n_SRIID, the response is multi-casted, and Host A will get the response and know this is the attacker. To avoid possible issues on switches that use source MAC addresses, the secret MAC addresses are distributed to the hosts. In addition, the host should randomize the use of the secret MAC address.

Phone-A sends MLD REPORT for IPv6 address saying I want to get multicast NS (i.e., during address resolution) only for this address group. Phone-B sends NS for the address resolution to Phone-A solicited node multicast group. Switch forwards this NS to Phone-A since they know on which port Phone-A registered for its group. However, during DAD, NS is not sent to the solicited node multicast group, or any multicast group that requires MLD REPORT registration. Secret MAC addresses are not used for DAD or Address Resolution. MLD REPORT is used for Address Resolution, where the solicited node multicast addresses for IPv6 addresses (not MAC addresses) are created. However, no host on the link will assign SLAAC with SRIID and there will not be address resolution for secret MACs. The attacker cannot verify that n_SRIID is DAD attack check, because the attacker does not have the secret key.

Intelligent DAD is interoperable with hosts/devices that do not utilize intelligent DAD. For example, a host that is not configured with intelligent DAD may inadvertently create a SLAAC address with one of the multiple SRIIDs, the other hosts configured with intelligent DAD should not prevent the unconfigured host from using the SLAAC address with the SRIID In other words, when the unconfigured and non-malicious host sends a NS with the SRIID, the other configured hosts will not respond with a NA. The SRIID will be marked "used" and/or "unavailable for intelligent DAD."

In summary, intelligent DAD employs multiple SRIIDs, randomizes when an address conflict check message with a SRIID is sent, allows unconfigured hosts to send address conflict check messages with a SRIID (e.g., allows unconfigured hosts to use a SRIID as a SLAAC address), employs multiple secret MAC address for a more robust intelligent DAD. By randomizing when the SRIID and S-MAC addresses are used, intelligent DAD prevents the attacker from discovering the SRIIDs and/or secret MAC addresses.

Furthermore, configured hosts should listen for address conflict check messages with the SRIIDs Host B cannot use the same SRIID as Host A, since two address conflict check messages from two different hosts, using the same IPv6 address would allow the attacker to discover the SRIID Therefore, Host B should wait for IPV6DADXMITS sec before sending its NS message with SRIID-B, SRIID-B !=SRIID-A (for example, for DADs during address renumbering for Stable SLAAC, or when a temporary address expires and a new one is created, Host B would start DAD algorithm using SRIID-B). The IPV6DADXMITS sec wait time allows Host A to report the DAD attack, and for the switch to block the attacker, by blocking the attacker's MAC address. The switch may allow the NA response with the secret SRIID-A, to pass to Host A (so the Host A can report the attack) and block the attacker's MAC address. Furthermore, if there is a NA response with the SRIID-B, block the attacker's port. Alternatively, the switch may block the NA with SRIID-A and report the attack to the monitoring server.

The detecting host/switch may report the prefix, MAC address, host serial number, etc. that can help identify the location of the attacker. The monitoring server raises the DAD attack alarm to notify a network administrator about the DAD attack. For example, the DAD report may include: identification of the attacked node; identification of the interface that the NA packet was received on (i.e., ingress interface); time of day when the NA packet was received by the node; all SLAAC IPs and NA source MAC addresses (potentially attacker MACs) for which DAD failed; all SRIIDs for which an attacker did not respond with NA; other data.

An unconfigured Host C may create a SLAAC address (i.e. a temporary address after a day) that is one of SRIIDs Host C will send a NS for that SRIID Since other configured hosts are monitoring if somebody is using a SRIID, they will detect the NS from Host C, and record the SRIID to be skipped. This implies multiple SRIIDs (at least two), should be used, to allow 3rd party/unconfigured hosts to create any SLAAC address. If Host C attaches to the link while Host A is trying to detect and/or recover from a duplicate address attack, Host C would not know about the SRIIDs already used by Host A, however, since the attacker may have already discovered these SRIIDs, there is no harm if Host C reuses the discovered SRIIDs.

In the event that there are no SRIIDs available, intelligent DAD is disabled. In order to prevent a time out, the host will create a SLAAC address and send the report about the DAD attack to the monitoring server.

In some embodiments, a method of detecting a duplicate address attack in a computing network is provided that generally comprises:
transferring a first address conflict check message;
receiving a first address conflict check response message;
performing intelligent Duplicate Address Detection (DAD) to determine if the duplicate address attack is detected, wherein the intelligent DAD is performed based on output from a random number generator; and
if the duplicate address attack is detected, then reporting the duplicate address attack to a monitoring server.

In some embodiments, a system for detecting a duplicate address attack in a computing network is provided that generally comprises:
a monitoring server; and
a host, wherein the host comprises:
a random number generator configured to provide a random output;
a communication interface configured to transfer an address conflict check request message;
the communication interface configured to receive a first address conflict check response message;
a processor configured to perform intelligent Duplicate Address Detection (DAD) based on the random output to determine if the duplicate address attack is detected; and
if the duplicate address attack is detected, then the communication interface configured to report the duplicate address attack to a monitoring server.

In some embodiments, an intelligent switch to detect a duplicate address attack in a computing network, the switch comprising:
a communication interface configured to detect a Neighbor Advertisement (NA) message;

a processor configured to determine the NA message contains a secret Random Interface Identifier (SRIID), and in response to determining the NA message contains the SRIID, the processor configured to determine an address associated with the NA message, and the communication interface configured to block all subsequent NA messages from the determined address.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous computing environments such as WIFI networks and multi-link subnet networks.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1A:
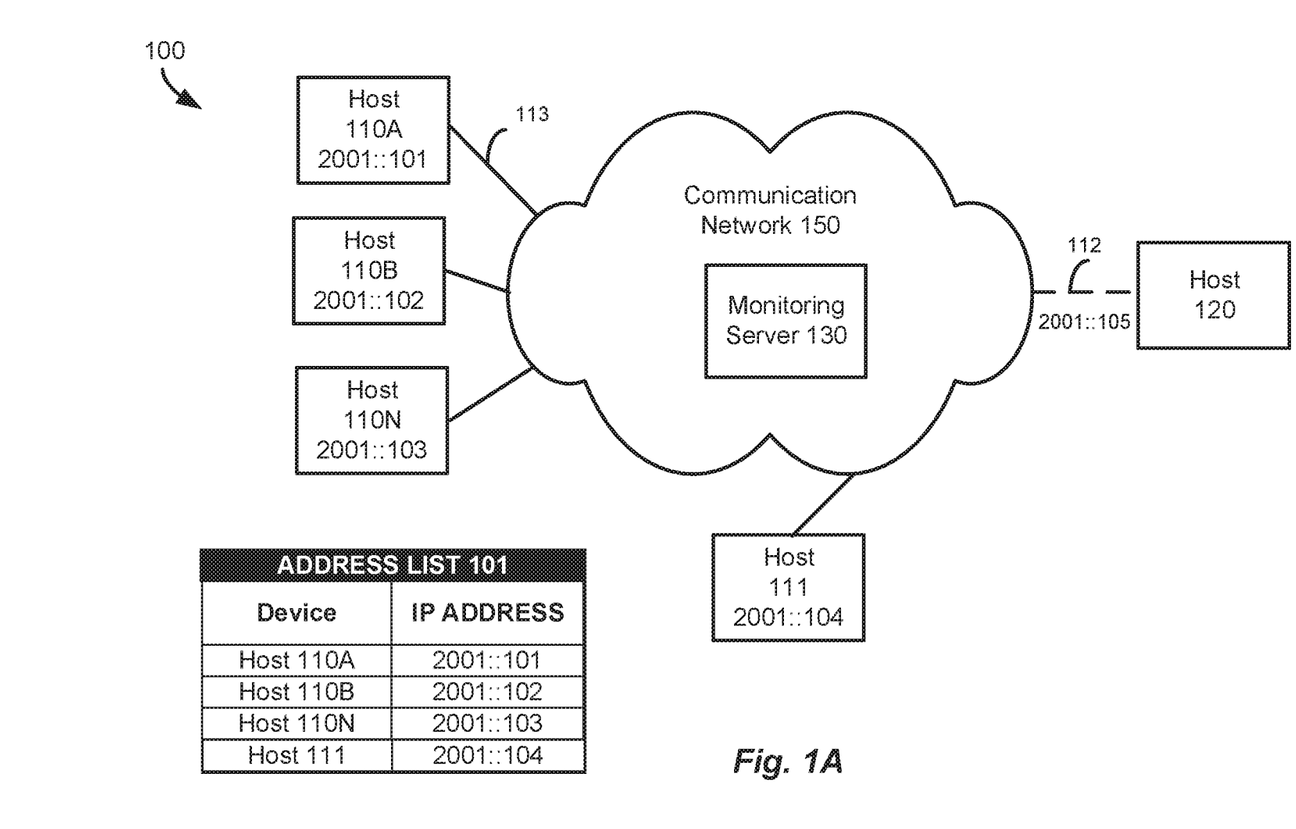
FIGS. 1A-1B is a block diagram depicting a communication system in accordance with embodiments of the present disclosure.
Figure 1B:
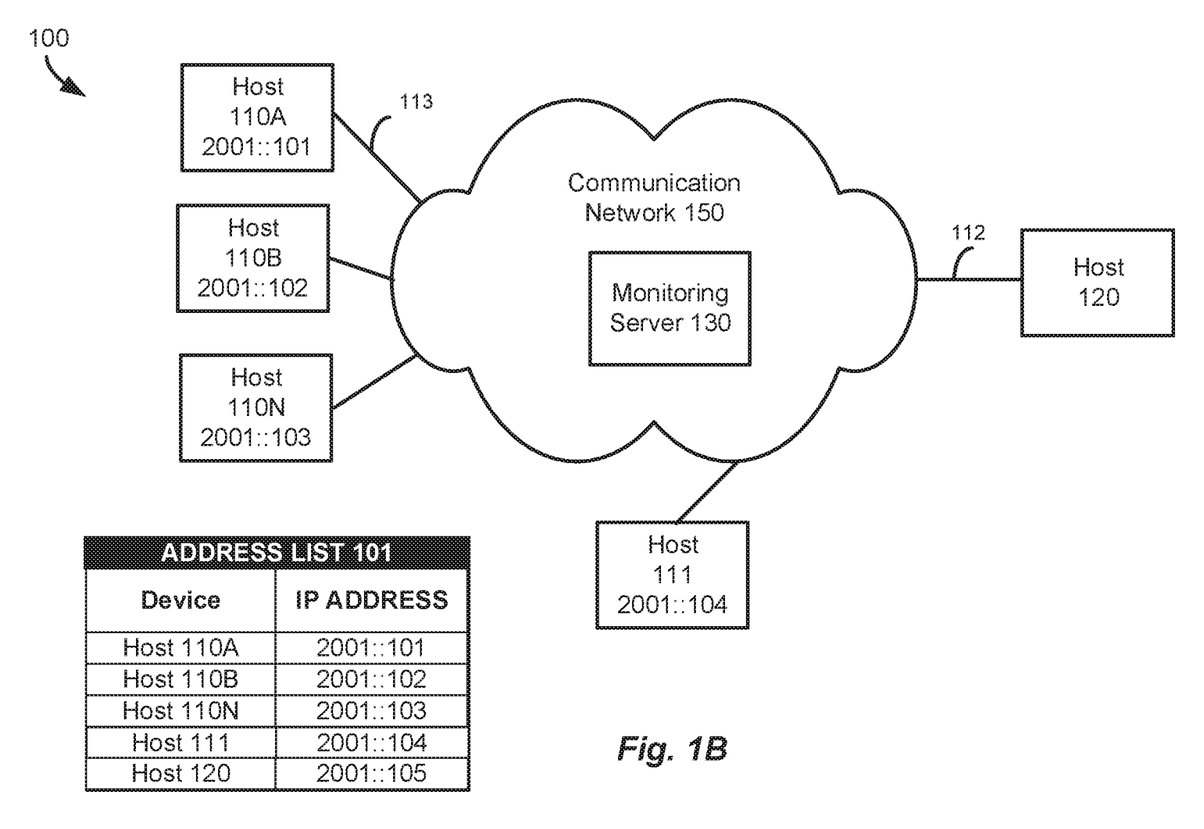

With reference initially to FIG. 1A, an illustrative communication system 100 will be described in accordance with at least some embodiments of the present disclosure. The system 100 is shown to include hosts 110A-N, a host 111, a host 120, a monitoring server 130, and a communication network 150. The hosts 110A, 110B, and 110N and 111 are connected to the communication network 150 as shown by the solid line 113. Address list 101 includes the IP addresses assigned to the hosts 110A, 110B, and 110N and 111. The host 110A is assigned IP address 2001::101, the host 110B is assigned IP address 2001::102, the host 110N is assigned IP address 2001::103, and the host 111 is assigned IP address 2001::104. The host 120 is attempting to connect to the communication network 150, as illustrated by the dotted line 112. For example, the host 120 may send an address conflict check message with the IP address 2001::105. The IP address 2001::105 is not assigned, so there is no address conflict check response message received in response to the address conflict check message sent by the host 120. Therefore, the host 120 uses the IP address 2001::105, and the host 120 is connected to the communication network 150 and the communication link 112 would change from a dotted line to a solid line like communication link 113, as illustrated in FIG. 1B.

In accordance with at least some embodiments of the present disclosure, the communication network 150 may comprise any type of known communication medium or collection of communication media and may use any type of protocols to transport messages between endpoints. The communication network 150 may include wired and/or wireless communication technologies. The Internet is an example of a communication network 150 that constitutes and Internet Protocol (IP) network consisting of many computers, computing networks, and other communication devices located all over the world, which are connected through many telephone systems and other means. Other examples of communication networks include, without limitation, a standard Plain Old Telephone System (POTS), an Integrated Services Digital Network (ISDN), the Public Switched Telephone Network (PSTN), a LAN, a WAN, a Session Initiation Protocol (SIP) network, a Voice over IP (VoIP) network, a cellular network, an enterprise network, and any other type of packet-switched or circuit-switched network known in the art. In addition, it can be appreciated that the communication network 150 need not be limited to any one network type, and instead may be comprised of a number of different networks and/or network types. Moreover, the communication network 150 may comprise a number of different communication media such as coaxial cable, copper cable/wire, fiber-optic cable, antennas for transmitting/receiving wireless messages, and combinations thereof.

In some embodiments, the hosts 110A-N, the host 111, and the host 120 may include a personal communication device. Examples of suitable hosts 110A-N and the host 120 include, without limitation, a telephone, a softphone, a cellular phone, a multi-speaker communication device (e.g., conference phone), a video phone, a PC, a laptop, a tablet, a PDA, a smartphone, a thin client, or any other host/device, even a server (a call server, a media server, . . . ), or a router that acts like a host, that use SLAAC method for the address assignment, or the like. It should be appreciated that hosts 110A-N and the host 120 may be configured to support single or multi-user interactions with other network-connected devices within an enterprise communication network and/or across multiple communication networks. In the depicted embodiment, each of the hosts 110A-N and the host 120 has a single user associated therewith, but it should be appreciated that a single communication device may be shared by more than one user without departing from the scope of the present disclosure.

Each host is configured to perform intelligent DAD, and the system is interoperable with hosts that are not configured with intelligent DAD (e.g., allowing configured hosts to create a SLAAC address using a SRIID).

Figure 2A:
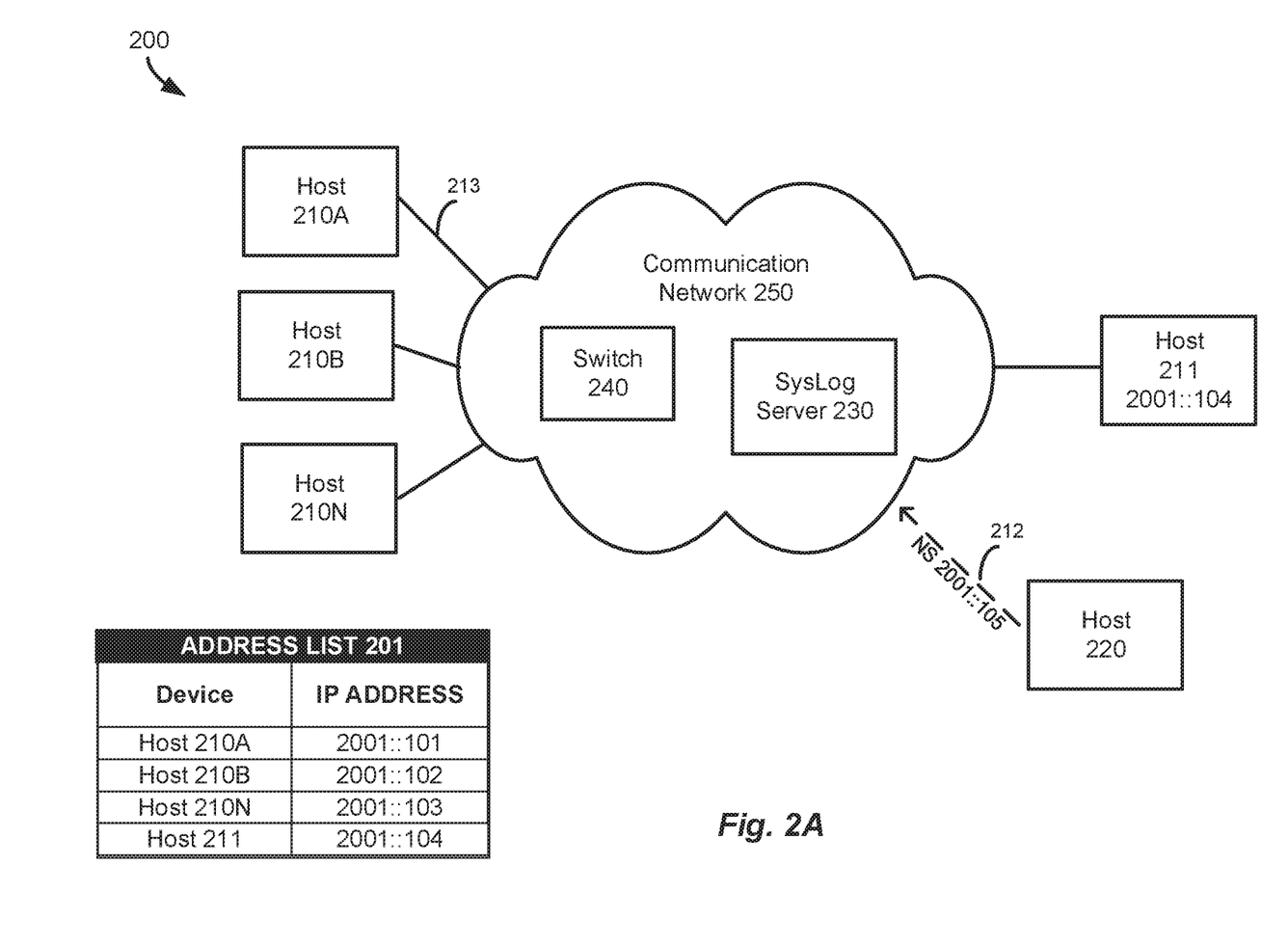
FIGS. 2A-2C illustrate a system and method for detecting a duplicate address attack on a computing network in accordance with embodiments of the present disclosure.
Figure 2B:
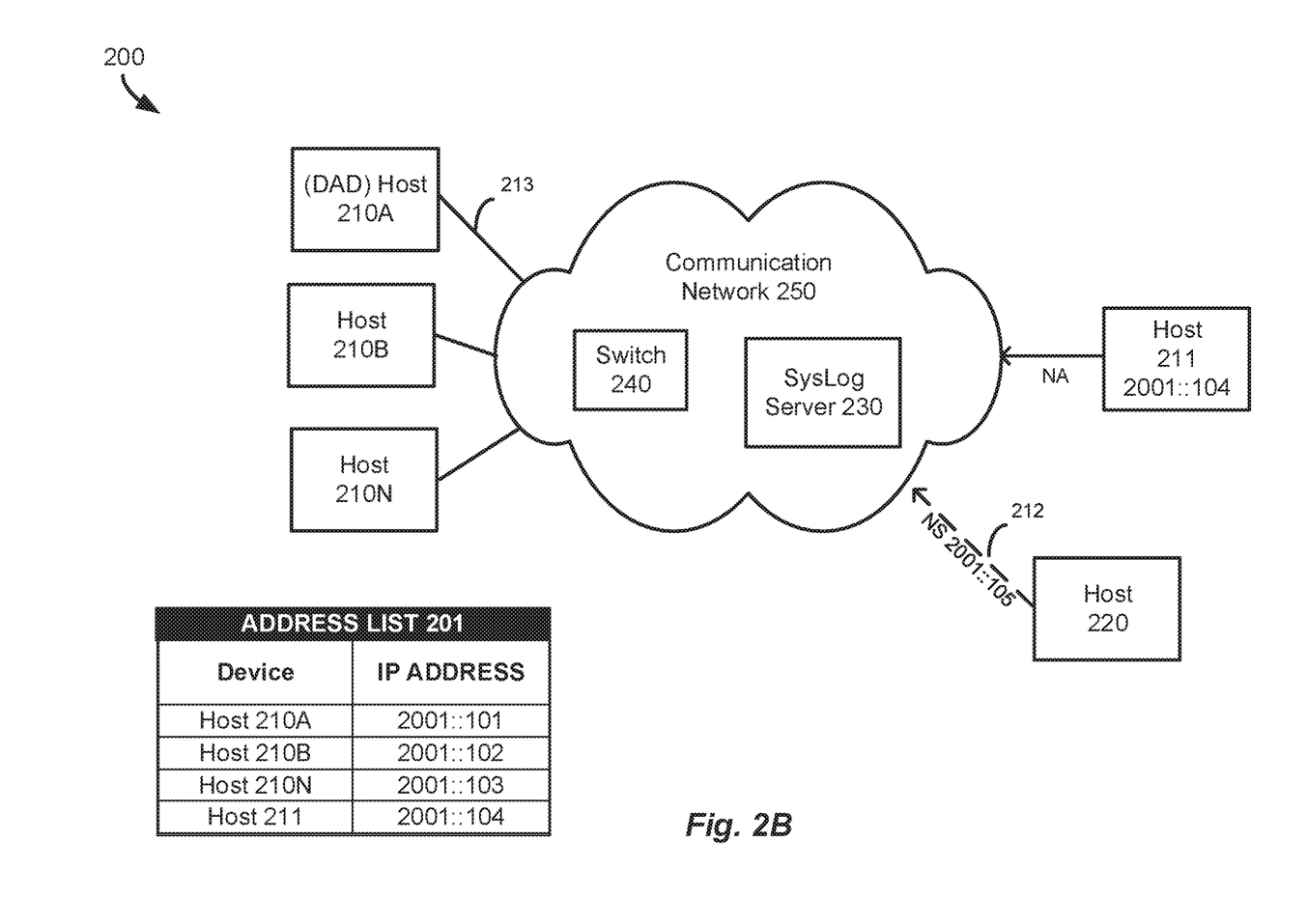
Figure 2C:
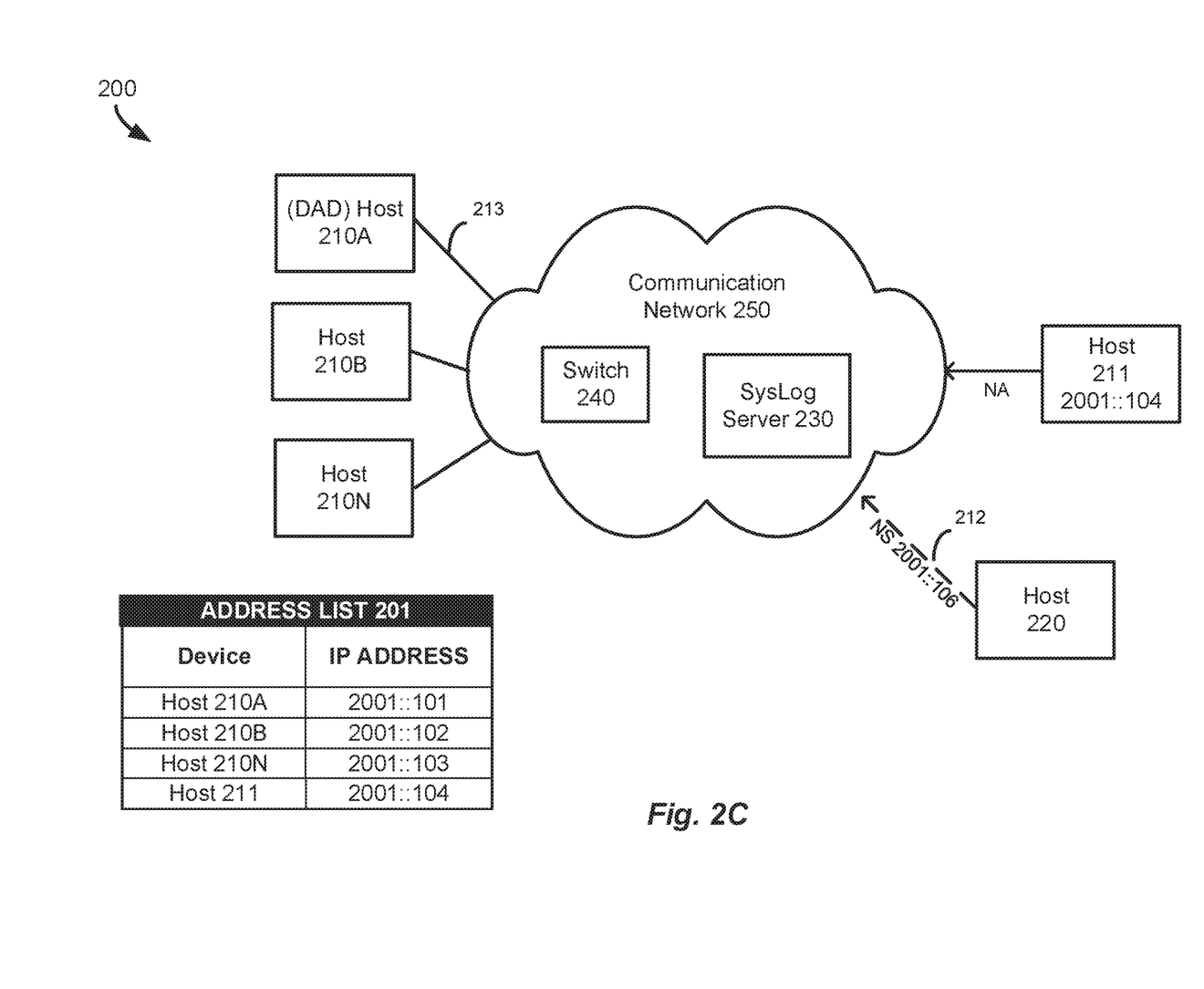

With reference now to FIGS. 2A-C, details of an intelligent DAD system 200 for discovering, reporting, and preventing duplicate address detection attacks will be described in accordance with at least some embodiments of the present disclosure.

With reference initially to FIG. 2A, the illustrative communication system 200 in which intelligent DAD is implemented as will be described in accordance with at least some embodiments of the present disclosure. The system 200 is shown to include hosts 210A-N, a host 211, a host 220, a SysLog server 230, a switch 240, and a communication network 250. Although as discussed herein each host 210A-N is configured with intelligent DAD, intelligent DAD may be centralized or distributed in system 200.

The hosts 210A, 210B, and 210N and the host 211 are connected to the communication network 250 as shown by a solid line 213. An address list 201 includes the IP addresses assigned to the hosts 210A, 210B, and 210N and 211. The host 210A is assigned the IP address 2001::101, the host 210B is assigned the IP address 2001::102, the host 210N is assigned the IP address 2001::103, the host 211 is assigned the IP address 2001::104.

In FIG. 2A, the host 220 is attempting to connect to the communication network 250, as illustrated by a dotted line 212. For example, the host 220 may send a Neighbor Solicitation (NS) message with the IP address 2001::105. The IP address 2001::105 is not assigned.

However, as illustrated in FIG. 2B, although the host 211 is assigned the IP address 2001::104, the host 211 responds to the NS message with the IP address 2001::105 with a NA message that the address is taken. The host 211 may be maliciously preventing other hosts from obtaining an IP address. The host 220 will intelligently perform DAD to determine whether or not the host 211 is maliciously preventing other hosts from obtaining an IP address by implementing a duplicate address detection attack on the communication network 250. The host 220 and/or switch 240 will ignore or block subsequent NAs from host 211 (suspected attacker).

As illustrated in FIG. 2C the Host 220 sends another NS message with IP address 2001::106, this may be a real SLAAC address or an SRIID. In some embodiments, the second NS message will also use a real SLAAC address in case the first NS/NA exchange was legitimate (e.g., the responding Host was actually assigned the IP address in the first NS message); and the intelligent DAD algorithm starts from the third NS message. If a NA message is received from the host 211, then the host 220 continues to perform intelligent DAD until the attack is confirmed.

Figure 3A:
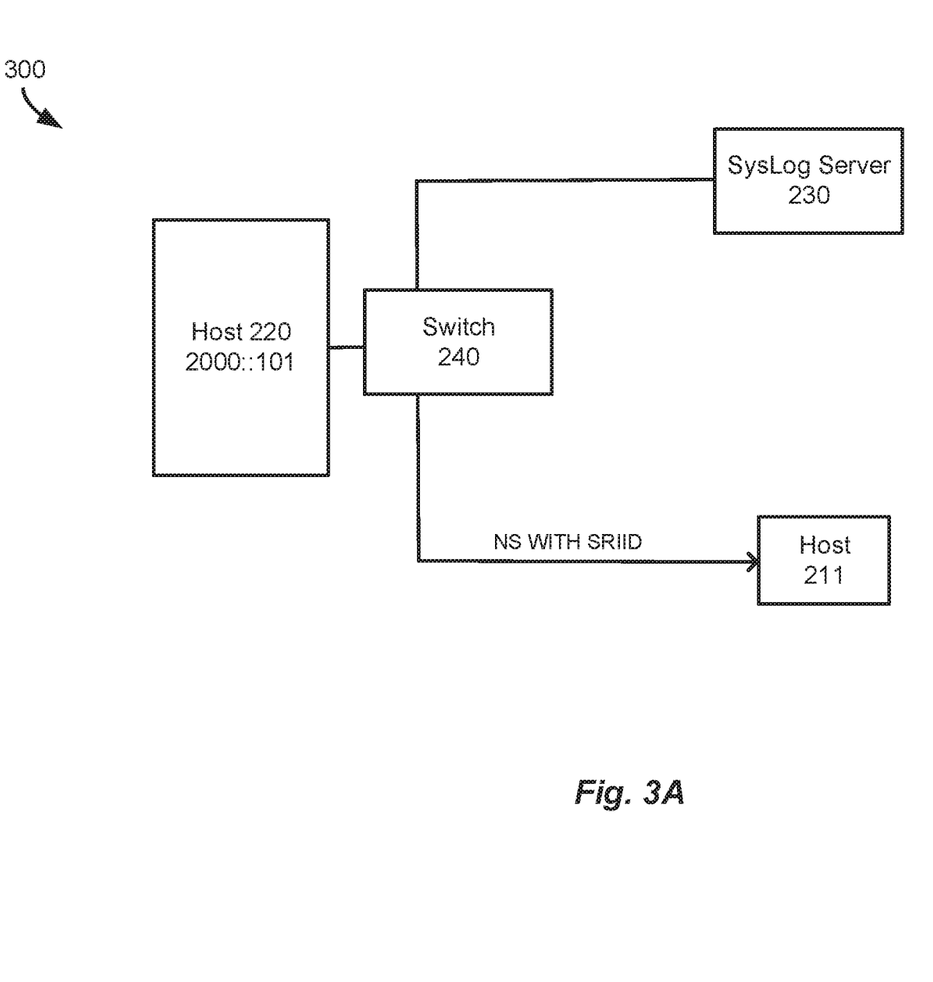
FIGS. 3A-3B are block diagrams depicting detection of a duplicate address attack on a computing network in accordance with embodiments of the present disclosure.

In FIG. 3A, the host 220 randomly sends an NS message with an SRIID to the host 211. In some examples, the system 200 and/or the host 220 includes a random number generator, and the NS message with the SRIID is sent based on the output from the random number generator. In other examples, the system 200 has another method to randomize whether the NS message with the SRIID is sent. Whether the special NS message with the SRIID is sent is randomized in order to prevent the attacker from predicting/detecting the intelligent DAD. For example, the system 200 may mix real NS messages with an NS message with the SRIID in order to intelligently detect the duplicate address attack. In some embodiments, the SRIID is pre-allocated and not available for assignment (e.g., the SRIID is assigned manually or sent in an out of band message). However, an SRIID may be assigned to an unconfigured host. In some embodiments, the configured hosts 210A-N and 220 will also have one or more secret/undiscoverable MAC addresses so that the host 211 is unable to detect the subsequent NS message with the SRIID is sent from the same device/host.

In some embodiments, the host 220 may additionally use a secret MAC address to prevent the host 211 from correlating the NS messages are from the same host. In some examples, the host 220 may send a message to another configured host (e.g., hosts 210A-N) to send a NS message, to further confuse the attacker (i.e., host 211).

Figure 3B:
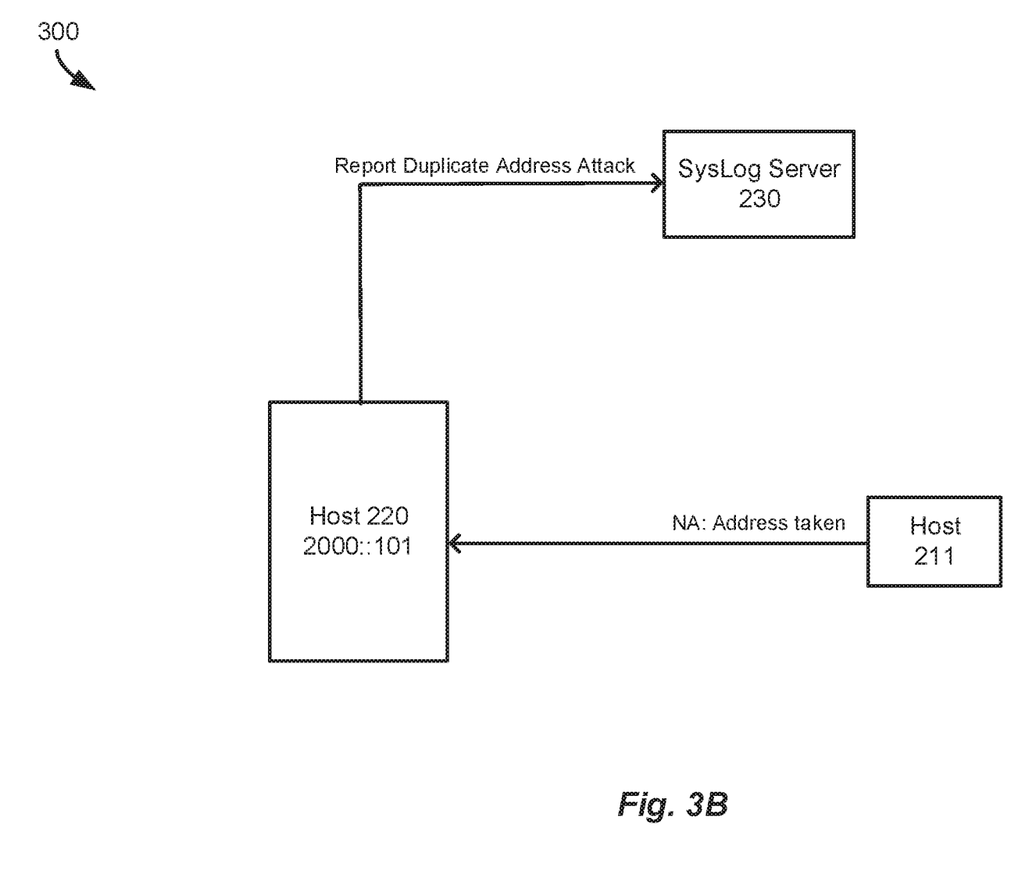

As illustrated in FIG. 3B, the host 211 responds to the NS message with the SRIID with an NA message claiming the host 211 has the address with the SRIID, the host 220 will discover the duplicate address detection attack. The host 220 will ignore the NA message from the host 211; and report the duplicate address detection attack to the SysLog server 230. The host 220 may send another NS message with an SLAAC address (to avoid using an SRIID) and ignore any responses from the host 211 in order to obtain an IP address to communicate with the SysLog Server 230.

Figure 4:
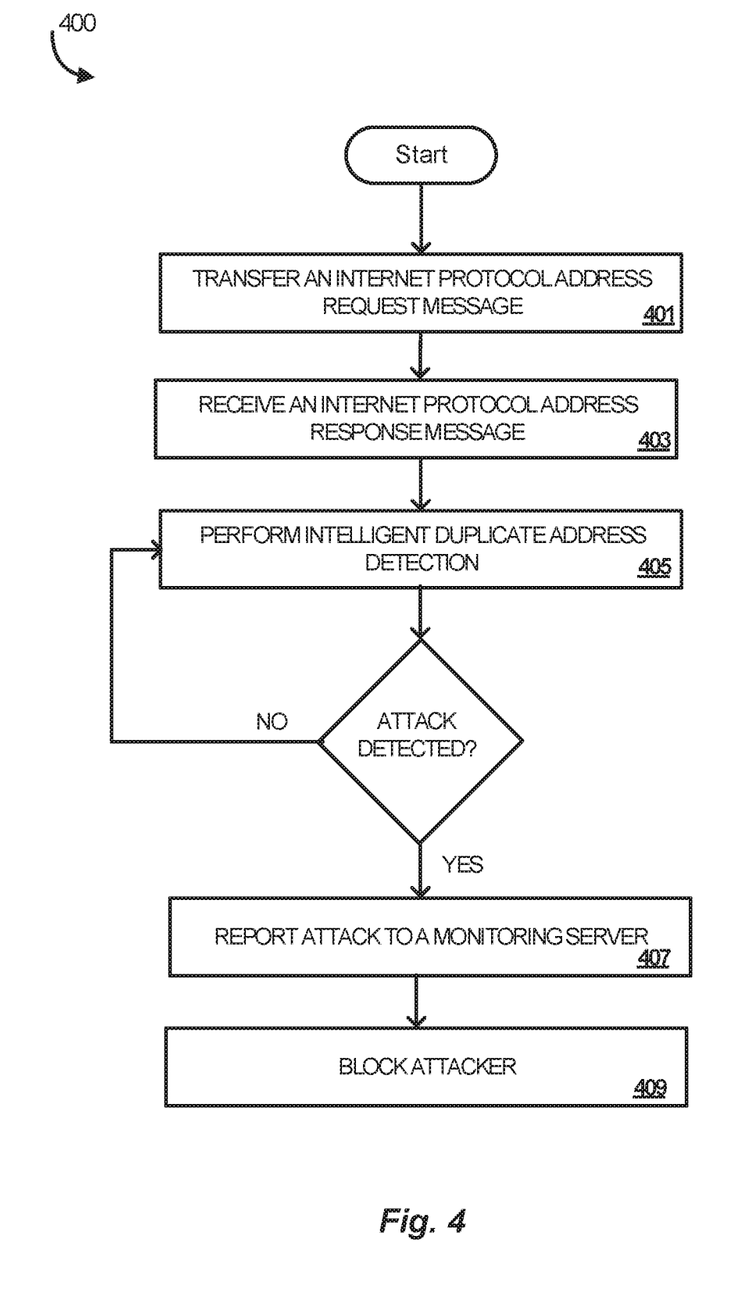
FIG. 4 is a flow diagram depicting a process to intelligently apply DAD to discover, report, and prevent duplicate address detection attacks in accordance with embodiments of the present disclosure.

FIG. 4 illustrates an example flow of an operation 400 to intelligently apply DAD to detect a duplicate address attack. The processes of operation 400 are referenced parenthetically in the paragraphs that follow, along with references to the elements and systems from communication system 200 of FIGS. 2A-C.

As illustrated in FIG. 4, operation 400 starts, and in step 401 an address conflict check message is transmitted. For example, the IP address 2001::105 is not assigned, and the host 220 sends an address conflict check message (e.g., a Neighbor Solicitation (NS) message) with the IP address 2001::105. In step 403 an address conflict check response message is received. For example, the host 211 responds to the NS message with a NA message that the address is taken, although the host 211 is assigned the IP address 2001::104. In step 405, intelligent DAD is performed until the system can determine whether or not a duplicate address detection attack is being implemented on the communication network 250. For example, the host 220 randomly sends a NS message with an SRIID For example, the host 220 includes a random number generator, and the NS message with the SRIID is sent based on the output of the random number generator. If a NA message is received in response to the NS message with the SRIID, the duplicate address attack is detected (Yes), and the process proceeds to step 407, the duplicate address attack is reported to a monitoring server. In step 409, the attacker is blocked. As part of, or separate from steps 407 and 409, once the duplicate address detection attack is detected, a host is assigned a valid SLAAC address (e.g., sends another NS message with a valid SLAAC and ignores the NA message from the attacker).

Figure 5:
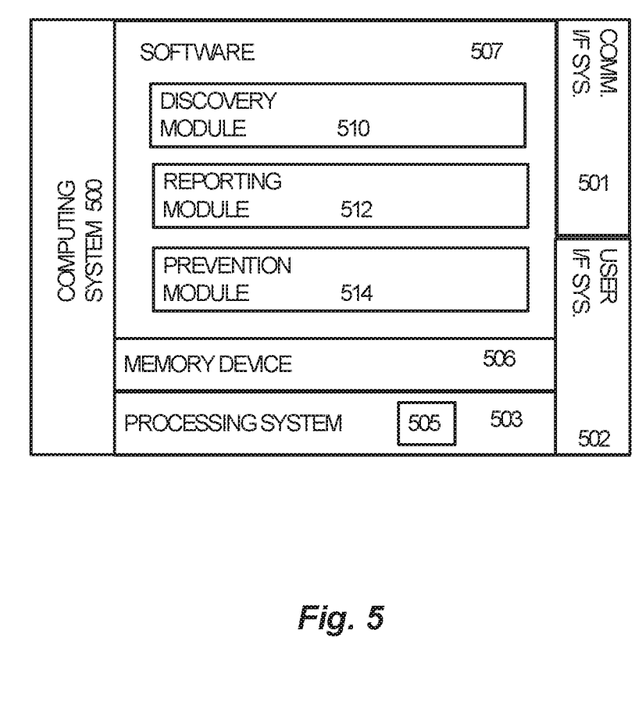
FIG. 5 is a block diagram of a computer used to implement the method to intelligently apply DAD to discover, report, and prevent duplicate address detection attacks in accordance with embodiments of the present disclosure.

In further embodiments, a secret MAC address is used. By the host 220 changing its MAC address in the NS message, the attacker (e.g., host 211) will not be able to detect the new/special NS message is from the same host. The secret MAC address prevents the attacker from correlating the NS messages and purposefully ignoring a subsequent message to discover the SRIID FIG. 5 illustrates a computing system 500 used to intelligently apply DAD to discover, report, and prevent duplicate address attacks as described herein, according to one implementation. Similar computing systems may be included in the hosts 110A-N, host 210A-N and 220 described herein used to intelligently apply DAD to discover, report, and prevent duplicate address attacks. The computing system 500 is representative of any computing system or systems with which the various operational architectures, processes, scenarios, and sequences disclosed herein for providing a communication service and selecting media paths may be implemented.

The computing system 500 comprises a communication interface 501, a user interface 502, and a processing system 503. The processing system 503 is linked to communication interface 501 and user interface 502. The processing system 503 includes a microprocessor and/or processing circuitry 505 and a memory device 506 that stores operating software 507. The computing system 500 may include other well-known components such as a battery and enclosure that are not shown for clarity. The computing system 500 may comprise a server, a host, a user device, a desktop computer, a laptop computer, a tablet computing device, or some other user communication apparatus.

The communication interface 501 comprises components that communicate over communication links, such as network cards, ports, radio frequency (RF), processing circuitry and software, or some other communication devices. The communication interface 501 may be configured to communicate over metallic, wireless, or optical links. The communication interface 501 may be configured to use Time Division Multiplex (TDM), Internet Protocol (IP), Ethernet, optical networking, wireless protocols, communication signaling, or some other communication format—including combinations thereof. In some implementations, the communication interface 501 is configured to communicate with other end user devices, wherein the communication interface is used to transfer and receive data communications for the devices.

The user interface 502 comprises components that interact with a user to receive user inputs and to present media and/or information. The user interface 502 may include a speaker, microphone, buttons, lights, display screen, touch screen, touch pad, scroll wheel, communication port, or some other user input/output apparatus—including combinations thereof. The user interface 502 may be omitted in some examples.

The processing circuitry 505 comprises a microprocessor and other circuitry that retrieves and executes the operating software 507 from the memory device 506. The memory device 506 may include volatile and nonvolatile, removable and non-removable media implemented in any method or technology for storage of information, such as computer readable instructions, data structures, program modules, or other data. The memory device 506 may be implemented as a single storage device, but may also be implemented across multiple storage devices or sub-systems. The memory device 506 may comprise additional elements, such as a controller to read the operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 505 is typically mounted on a circuit board that may also hold the memory device 506 and portions of the communication interface 501 and the user interface 502. The operating software 507 comprises computer programs, firmware, or some other form of machine-readable program instructions. The operating software 507 includes a discovery module 510, a reporting module 512, and a prevention module 514, although any number of software modules within the application may provide the same operation. The operating software 507 may further include an operating system, utilities, drivers, network interfaces, applications, or some other type of software. When executed by the processing circuitry 505, the operating software 507 directs the processing system 503 to operate the computing system 500 as described herein.

In at least one implementation, the discovery module 510, when read and executed by the processing system 503, directs the processing system 503 to intelligently use DAD to detect a duplicate address attack. The reporting module 512, when read and executed by the processing system 503, directs the processing system 503 to report the duplicate address detection attack to a monitoring server. The prevention module 514, when read and executed by the processing system 503, directs the processing system 503 to block the device executing the duplicate address detection attack.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of detecting a duplicate address attack in a computing network, the method comprising:
   transferring a first address conflict check message;
   receiving a first address conflict check response message; and
   in response to receiving the first address conflict check response message, performing intelligent Duplicate Address Detection (DAD) to determine if the duplicate address attack is detected, wherein the intelligent DAD comprises:
   transferring at least one subsequent address conflict check message, wherein each subsequent address conflict check message includes either a secure random interface identifier (SRIID) or a real Stateless Address Autoconfiguration (SLAAC) address, wherein whether each subsequent address conflict check message includes the SRIID is random, wherein one or more SRIIDs are pre-allocated and are not available for assignment by hosts configured with intelligent DAD, wherein the first address conflict check message and the at least one subsequent address conflict check message are sent by a same host, and wherein a source MAC address for the at least one subsequent address conflict check message is different from a source MAC address in the first address conflict check message;
   if an address conflict check response message is received in response to a subsequent address conflict check request message including the SRIID, then the duplicate address attack is detected; and
   if the duplicate address attack is detected, then reporting the duplicate address attack to a monitoring server and blocking a host associated with the duplicate address attack.

2. The method of claim 1, wherein performing the intelligent Duplicate Address Detection (DAD) further comprises:
   ignoring subsequent address conflict check response messages transferred from a host associated with the first address conflict check response message.

3. The method of claim 2, wherein transferring the at least one subsequent address conflict check message further comprises:
   transferring the at least one subsequent address conflict check message configured to include the SRIID and a secret MAC address.

4. The method of claim 2, further comprising:
   blocking the host associated with the address conflict check response message received in response to a subsequent address conflict check message including the SRIID.

5. The method of claim 1, wherein the computing network comprises a wireless network.

6. The method of claim 1, wherein the computing network comprises multi-link subnets.

7. The method of claim 1, wherein the first address conflict check message comprises a multicast Neighbor Solicitation (NS) message, and wherein the first address conflict check response message comprises a multicast Neighbor Advertisement (NA) message.

8. The method of claim 1, wherein the monitoring server comprises a System Log (SysLog) server.

9. A system to detect a duplicate address attack in a computing network, wherein the system comprises hardware components, the system comprising:
   a monitoring server; and
   an intelligent Duplicate Address Detection (DAD) host, wherein the intelligent DAD host comprises:
   a communication interface configured to transfer a first address conflict check message;
   the communication interface configured to receive a first address conflict check response message; and
   in response to receiving the first address conflict check response message, a processor configured to perform intelligent Duplicate Address Detection (DAD), wherein the intelligent DAD comprises:

transferring at least one subsequent address conflict check message, wherein each subsequent address conflict check message includes either a secure random interface identifier (SRIID) or a real SLAAC address, wherein whether each subsequent address conflict check message includes the SRIID is random, wherein one or more SRIIDs are pre-allocated and are not available for assignment by hosts configured with intelligent DAD, wherein the first address conflict check message and the at least one subsequent address conflict check message are sent by a same host, and wherein a source MAC address for the at least one subsequent address conflict check message is different from a source MAC address in the first address conflict check message;

if an address conflict check response message is received in response to a subsequent address conflict check request message including the SRIID, then the duplicate address attack is detected; and if the duplicate address attack is detected, then the communication interface is configured to report the duplicate address attack to the monitoring server and block a host associated with the duplicate address attack.

10. The system of claim 9, further comprising:
an intelligent switch configured to block subsequent address conflict check response messages transferred from a host associated with the first address conflict check response message.

11. The system of claim 10, further comprising:
the communication interface configured to transfer the subsequent address conflict check message, wherein the subsequent address conflict check message is configured to include the SRIID and a secret MAC address.

12. The system of claim 9, wherein the computing network comprises a wireless network.

13. The system of claim 9, wherein the computing network comprises multi-link subnets.

14. The system of claim 9, wherein the first address conflict check message comprises a multicast Neighbor Solicitation (NS) message.

15. The system of claim 9, wherein the first address conflict check response message comprises a Neighbor Advertisement (NA) message.

16. The system of claim 9, wherein the monitoring server comprises a System Log (SysLog) server.

* * * * *